June 5, 1962 W. G. HICKS 3,037,807
CONVERTIBLE FLAT BED AND HOPPER BODY FOR VEHICLE
Filed May 23, 1960 7 Sheets-Sheet 1

INVENTOR.
Willie Glen Hicks.
BY
Harness, Dickey & Pierce.
ATTORNEYS

June 5, 1962   W. G. HICKS   3,037,807
CONVERTIBLE FLAT BED AND HOPPER BODY FOR VEHICLE
Filed May 23, 1960   7 Sheets-Sheet 2

INVENTOR.
Willie Glen Hicks
BY
Harness, Dickey & Pierce
ATTORNEYS

INVENTOR.
Willie Glen Hicks.
BY
Harness, Dickey & Pierce.
ATTORNEYS

June 5, 1962 W. G. HICKS 3,037,807
CONVERTIBLE FLAT BED AND HOPPER BODY FOR VEHICLE
Filed May 23, 1960 7 Sheets-Sheet 5

INVENTOR.
Willie Glen Hicks.
BY
Harness, Dickey & Pierce
ATTORNEYS

June 5, 1962 W. G. HICKS 3,037,807
CONVERTIBLE FLAT BED AND HOPPER BODY FOR VEHICLE
Filed May 23, 1960 7 Sheets-Sheet 6

INVENTOR.
Willie Glen Hicks.
BY
Harness, Dickey & Pierce
ATTORNEYS

United States Patent Office 3,037,807
Patented June 5, 1962

3,037,807
CONVERTIBLE FLAT BED AND HOPPER BODY FOR VEHICLE
Willie Glen Hicks, Livonia, Mich., assignor to Gar Wood Industries, Inc., Wayne, Mich., a corporation of Michigan
Filed May 23, 1960, Ser. No. 31,019
17 Claims. (Cl. 296—10)

This invention relates generally to a multi-purpose body for a wheeled vehicle and more particularly to a convertible flat bed and hopper body for a wheeled vehicle.

The requirement of flexibility in modern commercial vehicles has emphasized the need for an improved dual purpose trailer capable of handling comminuted materials as well as relatively bulky materials. The present invention is directed to a body for such a trailer that converts from a flat bed to a hopper for the hauling of bulk comminuted materials. A trailer body in accordance with the present invention solves a problem characteristically associated with dual purpose trailer bodies heretofore known and used, in that the utility and integrity of function of both the hopper and the flat bed is undiminished due to the convertability thereof.

More particularly, a trailer body in accordance with the present invention has a novel sealing structure on the panels of the hopper that seals and structurally reinforces the panels with respect to the frame of the trailer to prevent the leakage of comminuted materials from the hopper and, upon conversion to a flat bed, locks the side panels in the horizontal condition to provide a structurally sound bed for the trailer.

Accordingly, one object of the present invention is a multi-purpose trailer having provision for the hauling of both comminuted materials and relatively bulky materials.

Another object is a dual purpose trailer having bed portions that are foldable upwardly to form a hopper for the carrying of bulk comminuted materials.

Another object is a trailer having a foldable hopper that is positively sealable with respect to the trailer frame.

Another object is a trailer having a convertible hopper that is structurally rigid in the open condition.

Another object is a convertible flat bed and hopper that is positively lockable in the flat condition to form a rigid structure.

Another object is an improved hopper reinforcing means and associated structures.

Other objects and advantages of the present invention will become apparent from the following description wherein reference is made to the drawings in which.

A trailer 20, upon which a convertible flat bed and hopper in accordance with the present invention has particular utility, comprises a trailer frame 22 having generally parallel side channels 24 and 26 connected by a plurality of suitable transverse members 28 for the support of conventional wheel bogies 30 and 32. A suitable dump valve assembly 40 underlies the frame 22 of the trailer 20 to direct and control the dumping of comminuted materials.

A convertible flat bed and hopper 50 in accordance with an exemplary embodiment of the present invention comprises a pair of side panels 52 and 54, made from, for example, one inch thick waterproof plywood, that are foldable from a horizontal or flat position with respect to the frame 22 of the trailer 20 to an upright position about spaced axes extending generally parallel to the central longitudinal axis of the trailer 20. The side panels 52 and 54 are joined by complementary front and rear panels 56 and 58 that are foldable upwardly from a horizontal or flat position with respect to the frame 22 about spaced axes extending laterally of the trailer 20 to an upright position angularly related to the frame 22 of the trailer 20.

The side panels 52 and 54 are stabilized in the upright position to preclude outward bulging thereof, under the pressure of comminuted materials carried within, by a plurality of transversely extending spreader bars 62, 64 and 66, each of which has a structural configuration suited to its particular function and location, as will be described.

Figures 6, 7:
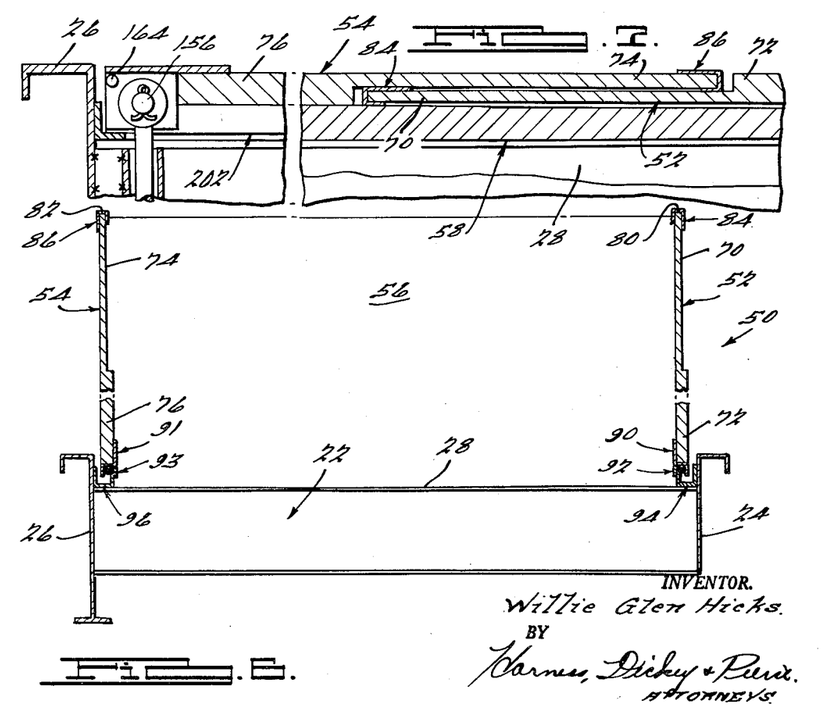
FIG. 6 is a cross-sectional view taken substantially along the line 6—6 of FIG. 3, enlarged for clarity.
FIG. 7 is a fragmentary cross-sectional view of the side walls of the hopper in the downwardly folded position.
Figure 8:
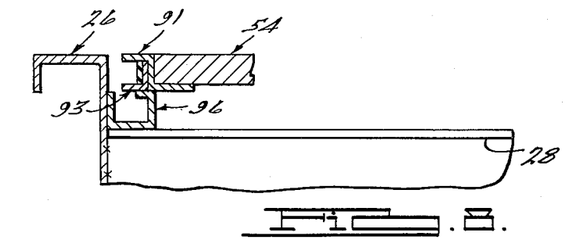
FIG. 8 is a fragmentary cross-sectional view showing seating of the side panel in the folded position.

Referring to FIG. 6, the side panels 52 and 54 are shown in the upright position with respect to the longitudinal frame members 24 and 26 and transverse members 28. The side panel 52 has a relieved section 70 at the upper end thereof that is relatively thinner than a lower section 72 for the accommodation of a complementary relatively thin upper end section 74 on the side panel 54, in overlapping or nesting relationship. Thus, when the side panels 52 and 54 are folded downwardly to rest on top of the downwardly folded end panels 56 and 58 which lie on the transverse member 28, the bed of the trailer formed thereby is substantially flat, the additive thickness of the overlapping end portions 70 and 74 of the side panels 52 and 54, respectively, being substantially equal to the thickness of the lower end portions 72 and 76 thereof, respectively.

The upper edge faces 80 and 82 of the side panels 52 and 54, respectively, are provided with a pair of longitudinally extending generally U-shaped cap channels 84 and 86, for the purpose of reinforcement and protection.

The side panels 52 and 54 are provided with a pair of longitudinally extending, Z-irons 90 and 91, respectively, having a pair of angle irons 92 and 93 secured thereto as by welding. The Z and angle irons cooperate to form inverted U-shaped channels that in turn cooperate with a pair of complementary channels 94 and 96 secured to the longitudinal frame members 24 and 26, respectively, as by welding, to function both as a seal and as a structural interlock between the side panels 52 and 54 and frame members 24 and 26 when the side panels 52 and 54 are in the upright position, as will be described.

Figure 5:
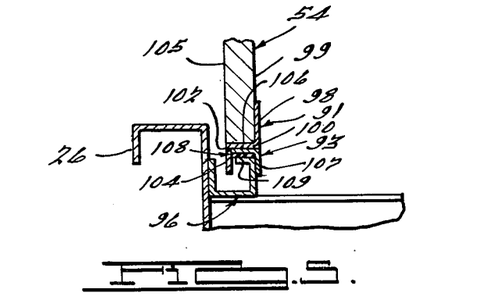
FIG. 5 is a cross-sectional view taken substantially along the line 5—5 of FIG. 3, enlarged for clarity.

Because the Z-irons 90 and 91, angle irons 92 and 93 and complementary channels 94 and 96 are similar in construction and function, for the purpose of clarity, only one cooperating assembly, namely, the members 91, 93 and 96, will be described in detail with particular reference to FIG. 5 of the drawings.

The Z-iron 91 and angle iron 93 cooperate with the longitudinally extending channel 96 that is secured to the side rail 26 and transverse frame members 28 to form a seal against leakage of comminuted materials. The Z-iron 91 has a vertically extending flange 98 lying against an inner surface 99 of the panel 54, a transverse section 100 abutting a lower edge face 102 of the panel 54 and a downwardly depending flange 104 that extends in generally coplanar relationship with an outer face 105 of the side wall 54. The angle iron 93 has a horizontal flange 106 that is juxtaposed against the transverse section 100 of the channel 91 and secured thereto as by welding, and a downwardly depending flange 107. The flanges 104 and 107 of the Z and angle irons 91 and 93 cooperate to form a downwardly opening generally U-shaped trough. A gasket 108, for example of rubber, is interposed between the lower face of the flange 106 and a generally horizontal seating flange 109 on the channel 96 to effect a seal therebetween. The downwardly depending flange 107 on the angle iron 93 engages the channel 96 thereby to restrict outward movement of the panel 54 under the bias of a load of comminuted material. It is to be noted that the interlocking relationship of the oppositely directed U-shaped channels function as a labyrinth to aid in sealing the panel 54 with respect to the frame 26. Also, the channel 96 functions as a rain gutter to carry water longitudinally of the trailer 20 and out the open ends thereof.

The aforementioned structural engagement between the angle iron 93 and channel 96 requires that the panel 54 be elevated with respect to the channel 96 when it is desired to fold the panel 54 to the horizontal position. The side panels 52 and 54 are pivotally supported and biased upwardly and downwardly with respect to the channels 94 and 96 on the frame members 24 and 26, respectively, by a plurality of crank mechanisms 130, each of which is similar in construction. For the purpose of clarity, only one of the crank mechanisms 130 will be described hereinafter.

Each crank mechanism 130 (FIG. 12) comprises a tubular member 132 that is secured to a transverse support bracket 133 as by welding, the support bracket 133 being welded to the frame member 26. The tubular member 132 has a radial collar 134 welded to the lower end thereof, which, in combination with a complementary collar 136, positions and supports a rotatable nut 140. The nut 140 has a radial flange 142 that is accepted in a suitable circular recess 144 in the collar 136 thereby to position the nut 140 axially with respect to the tubular member 132. A crank 145 is secured to the nut 140, as by welding, to facilitate rotation of the nut 140 thereby to move a lead screw 150 axially of the nut 140 and tubular member 132.

Figure 12:
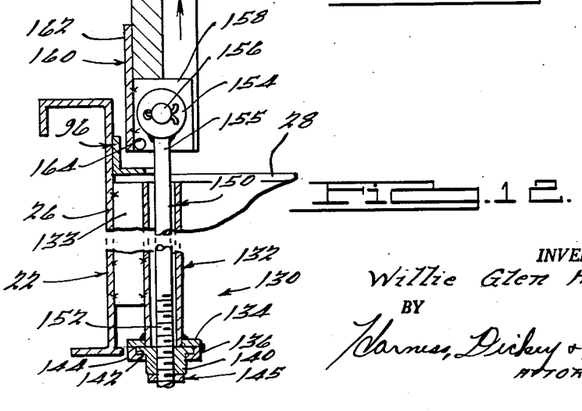
FIG. 12 is a cross-sectional view taken substantially along the line 12—12 of FIG. 3.

The lead screw 150 has a threaded lower end portion 152 for acceptance within the nut 140 and extends centrally of the tubular member 132. A bushing 154 is secured to the upper end portion 155 of the lead screw 150, as by welding, for the acceptance of a horizontally extending pivot pin 156. The pivot pin 156 is secured to an end plate 158 of a panel support bracket 160. The bracket 160 has an outer plate 162 that abuts the outer surface 105 of the side panel 54 to rigidly support the side panel 54 for both rotation and translation with respect to the frame 22 of the trailer 20. A stop pin 164 is secured to the lower end portion of the plate 158, as by welding, and is engageable with the lead screw 150, to function as a stop for the side panel 54 when the side panel 54 is rotated counterclockwise, as seen in FIG. 12, with respect to the frame 22.

As discussed hereinbefore, in order to effect rotation of the side panel 54 with respect to the channel 96, the side panel 54 must first be elevated with respect to the channel 96 so that the flange 107 on the angle iron 93 clears the channel 96.

Elevation of the panel 54 is accomplished, using the side panel 54 as an example, it being understood that the panel 52 is similarly elevatable by similar crank mechanism 130, by rotating the front and rear cranks 145 associated therewith to advance the lead screws 150 thereof upwardly with respect to the frame 22 and elevate the side panel 54. After the side panel 54 is elevated to a position wherein the flange portion 107 thereof clears the flange 109 on the channel 96, the side panel 54 is rotatable to a horizontal position. The side panel 54 is then locked in the horizontal position with respect to the trailer frame 22 by retracting the lead screws 150 thereby drawing the flange portion 98 of the channel 91 downwardly against the flange 109 of the channel 96. Because the front and rear panels 56 and 58, which are foldable in a manner to be described, are folded downwardly prior to the side panels 52 and 54, retraction of the lead screws 150 locks the entire assemblage in the horizontal position.

Figure 3:
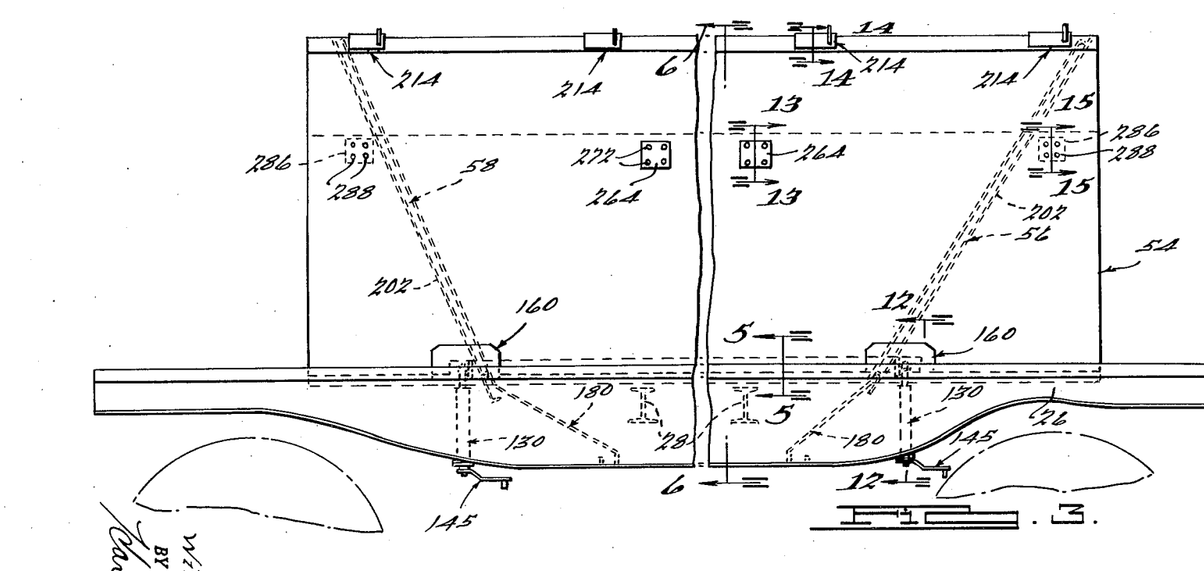
FIG. 3 is a side elevation of the trailer of FIG. 1.
Figure 4:
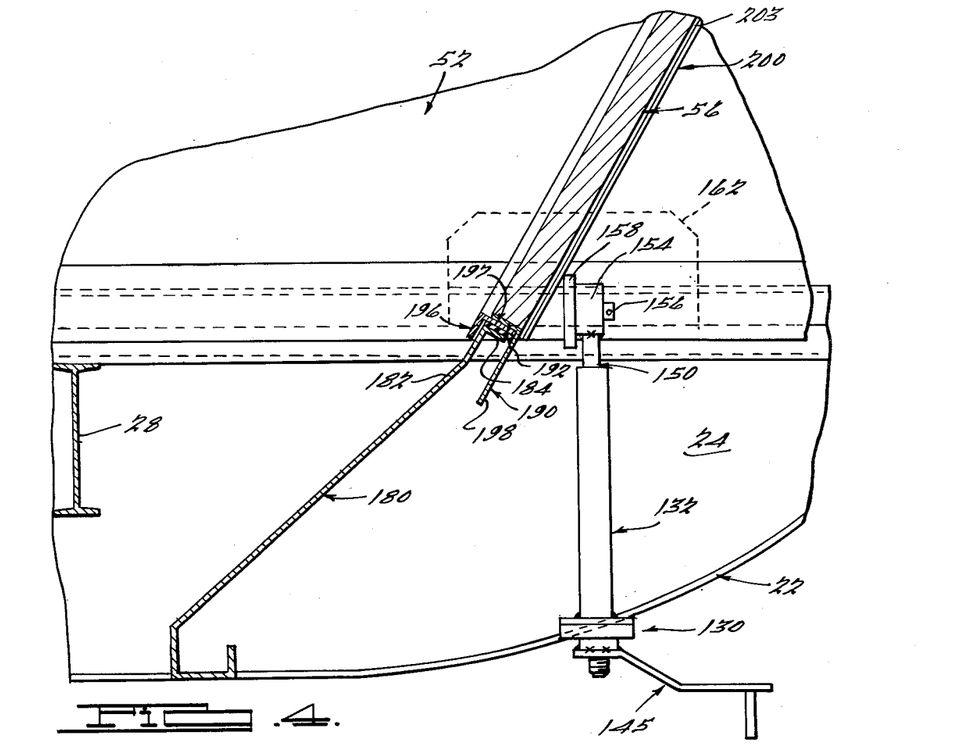
FIG. 4 is a cross-sectional view taken substantially along the line 4—4 of FIG. 2 enlarged for clarity.

As best seen in FIGS. 3 and 4 a pair of transverse plates 180 extend between the side rails 24 and 26 and are secured thereto as by welding. The plates 180, because of their angular orientation with respect to the horizontal, form a downwardly convergent spout within the frame 22 of the trailer 20. The upper end portions 182 of the transverse plates 180 are folded to form flanges 184 which function as seats for the front and rear panels 56 and 58. Because the front and rear panels 56 and 58 are similar in construction, for the purpose of clarity, only the front panel 56 will be described in detail.

The front panel 56 has an angle iron 190 secured to a lower edge face 192 thereof which, in combination with an angle iron 196, defines a generally U-shaped channel adapted to be seated on the flange 184 of the transverse member 180. A resilient gasket 197 of, for example, rubber, is bonded to the inner face of the channel to effect a seal between the panel 56 and the transverse member 180 when the panel 56 is in the upright position, as seen in FIG. 4.

Figure 9:
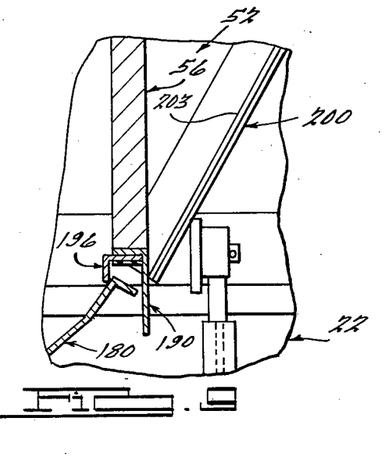
FIG. 9 is a fragmentary cross-sectional view similar to FIG. 4 showing the hopper end wall at a first intermediate position upon folding thereof into a flat position on the trailer bed.
Figure 10:
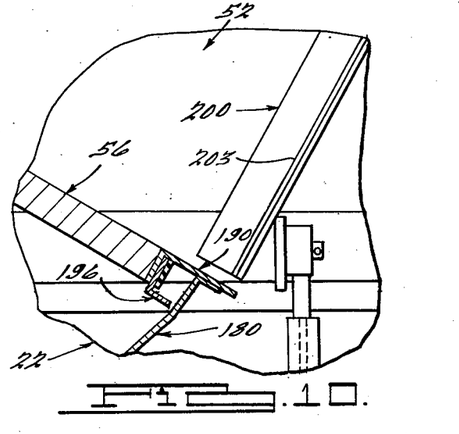
FIG. 10 is a fragmentary cross-sectional view similar to FIG. 9 with the end wall of the hopper at the next subsequent position upon folding thereof.
Figure 11:
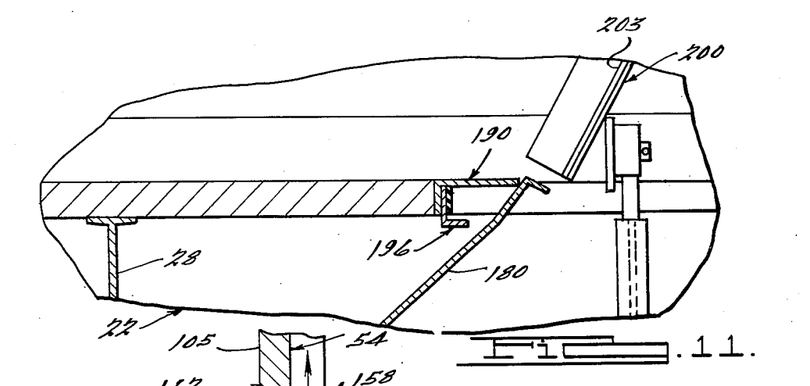
FIG. 11 is a cross-sectional view of the end wall of the hopper in the downwardly folded condition.

As best seen in FIGS. 9 through 11, the front panel 56 is foldable downwardly and rearwardly of the frame 22 by pushing rearwardly thereon whereupon the angle 196 rides up on the member 180 and the angle 190 rides over the flange 184 on the member 180, a lower end portion 198 on the angle iron 190 guiding the panel 56 as it moves rearwardly. The angle iron 190 is particularly important in guiding the panel 56 for movement upwardly and rearwardly of the transverse member 180 when raising the front panel 56 in that it guides the angle 196 of the panel 56 into initial engagement with the member 180 whereupon it is conditioned for rotation about the flange 184. It is also apparent that the angle irons 190 and 196 prevent forward or rearward movement of the panel 56 with respect to the member 180.

The rear panel 58 is supported and foldable in a manner similar to the front panel 56.

It is to be noted that the side panels 52 and 54 are provided with a pair of angularly upwardly extending angle irons 200 and 202, respectively, each having a gasket 203 thereon, the angle irons 200 and 202 functioning to define the upright position of the front panel 56, and effecting a seal between the side panels 52 and 54 and the end panels 56 and 58. A similar set of angle irons 200 and 202 define the upright position of the rear panel 58. When the hopper 50 is loaded wtih comminuted material, the angular relationship of the respective pairs of angle irons 200 and 202, and therefore of the panels 56 and 58, results in a downward component of force on the panels 56 and 58 tending to maintain a sealing relationship between the panels 56 and 58 and their associated transverse members 180.

Referring to FIGS. 2 and 13 through 18, a number of different types of spreader bars 62, 64 and 66, each having a particular application and function, are provided to support the side walls 52 and 54 in the upright position with respect to the frame 22 of the trailer 20 to resist outward bulging of the panels 52 and 54 when the hopper 50 is loaded wtih comminuted material.

Figure 14:
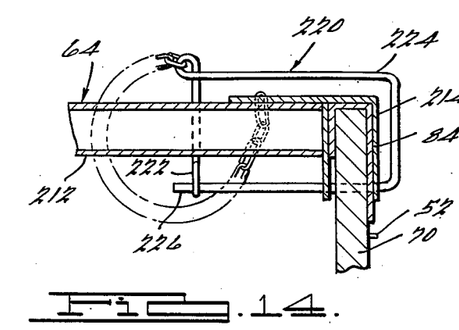
FIG. 14 is a cross-sectional view taken substantially along the line 14—14 of FIG. 3.

Referring to FIG. 14, the spreader bar 64 comprises a tubular member 212 having a generally U-shaped downwardly opening end clamp 214 shown operatively engaged with the upper end portion 70 of the side panel 52. The spreader bar 64 is pinned to the side panel 52 by a spring clamp 220 having a reentrantly folded hook portion 222 and a U-shaped body portion 224, one leg 226 of which is engageable in the loop 222.

Figure 13:
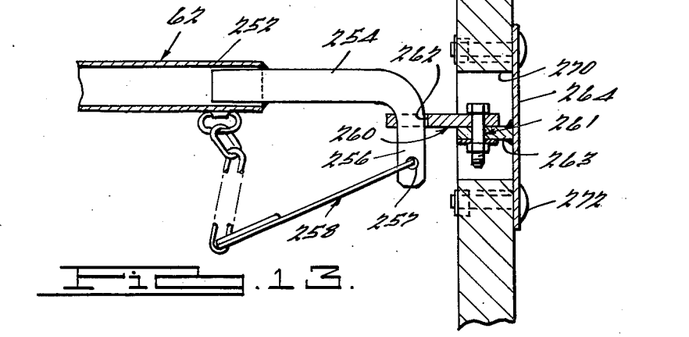
FIG. 13 is a cross-sectional view taken substantially along the line 13—13 of FIG. 3.
Figure 15:
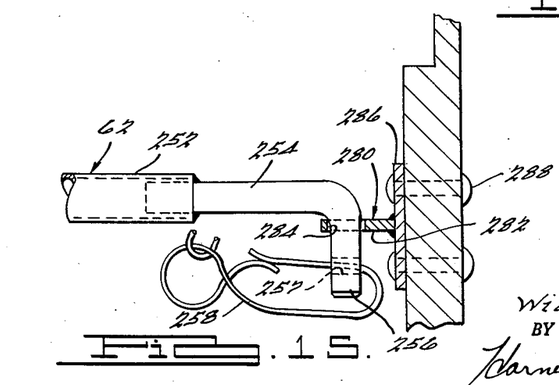
FIG. 15 is a cross-sectional view taken substantially along the line 15—15 of FIG. 3.

The spreader bar 62, as shown in FIGS. 13 and 15 comprises a tubular member 252 having a gooseneck 254 secured thereto as by welding. A downwardly extending portion 256 of the gooseneck 254 is engageable in a suitable latch bracket, to be described, and has a transverse bore 257 for the acceptance of a spring locking pin 258.

It is to be noted that where the side panels 52 and 54 overlie the front and rear panels 56 and 58, a foldable latch bracket is required to accommodate nesting of the panels 52, 54, 56 and 58.

Figure 16:
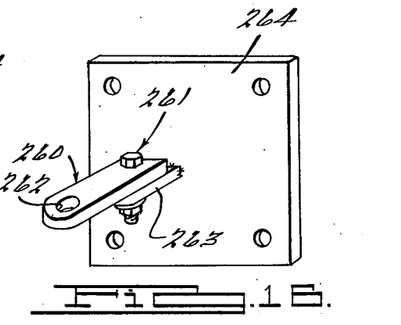
FIG. 16 is a perspective view of a collapsible locking bar latch.

As shown in FIGS. 13 and 16, a foldable latch bracket 260 is supported for rotation by a pin 261 and has an aperture 262 for the acceptance of the lower end 256 of the gooseneck 254. The latch pin 261 is supported by a transverse support 263 that is secured to a vertically extending side plate 264 as by welding. The transverse support 263 and latch 260 extend through a suitable aperture 270 in the side panel 52, the plate 264 being secured to the panel 52 as by a plurality of bolts 272. Upon folding of the panels 52 and 54, each latch bracket 260 is accommodated within its associated recess 270.

At those locations where a collapsible latch bracket is not required, a rigid latch 280 (FIG. 15) is provided for the spreader bar 62 comprising a horizontally extending latch bracket 282 with an aperture 284 therein for the acceptance of the downwardly extending portion 256 of the gooseneck 254. The latch bracket 282 of the latch 280 is secured to a vertically extending plate 286 as by welding, the plate 286 being secured to the side wall 52 as by a plurality of bolts 288.

Figure 1:
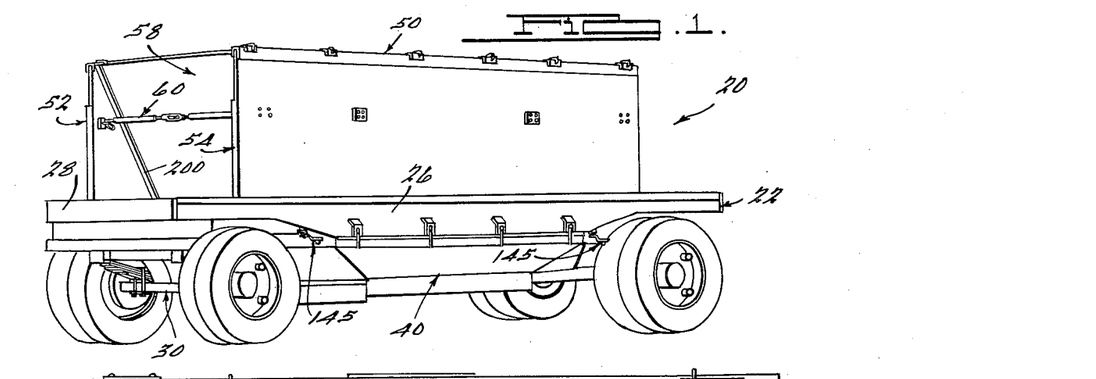
FIGURE 1 is a perspective view of a trailer in accordance with an exemplary embodiment of the present invention with the bed panels thereof folded upwardly to form a hopper.
Figure 2:
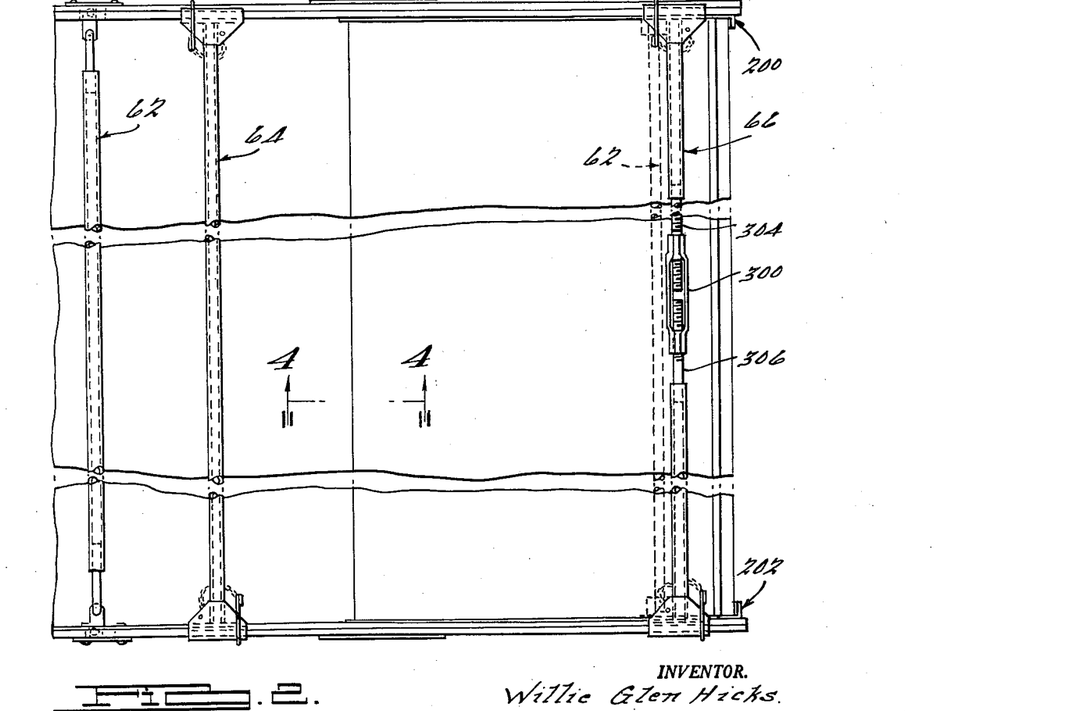
FIG. 2 is a fragmentary top view of the hopper of FIG. 1.

As best seen in FIG. 2, the spreader bar 66 is similar to the spreader bar 64 but is provided with a turn buckle 300 that accepts appropriately threaded rods 304 and 306 to facilitate adjustment of the length of the bar 66.

Figure 17:
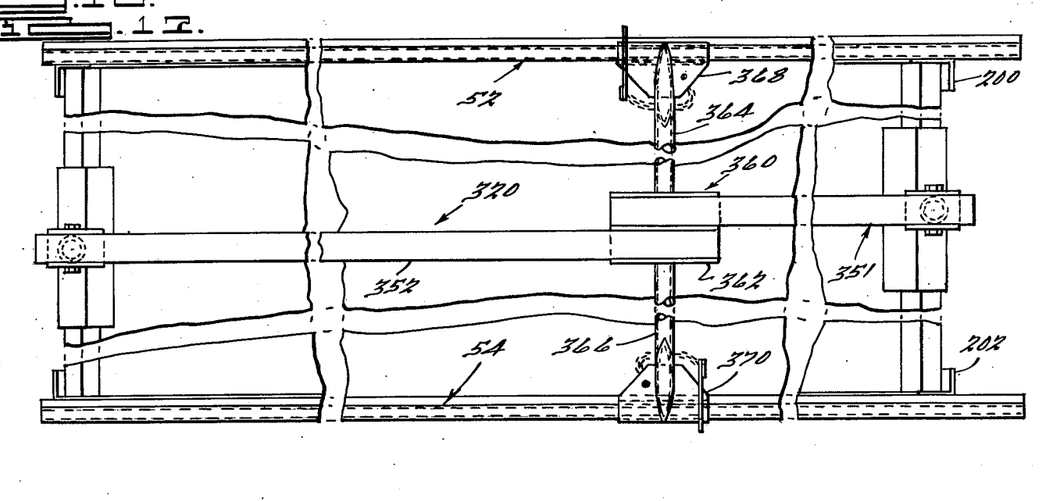
FIG. 17 is a fragmentary top view of the hopper body with a modified spreader bar and tarpaulin support attached thereto.
Figure 18:
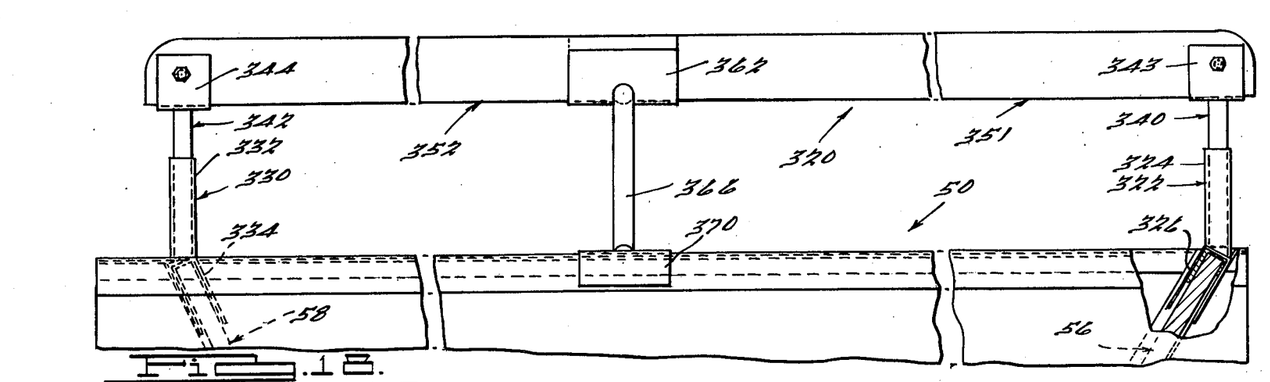
FIG. 18 is a side view of the spreader bar of FIG. 17.

Referring to FIGS. 17 and 18, the hopper 50 is provided with a spreader bar and ridge pole assembly 320 comprising a front pole support 322 having an upstanding tubular portion 324 that is secured to a downwardly extending U-shaped channel 326 as by welding. A similar rear pole support 330 comprises an upstanding tubular member 332 that is secured to a downwardly opening generally U-shaped member 334 as by welding. The end panels 56 and 58 are accepted in the U-shaped channels 326 and 334, respectively. A pair of upstanding circular ridge pole supports 340 and 342 having upwardly opening U-shaped brackets 343 and 344, respectively, are accepted within the tubular members 324 and 332, respectively, for the support of a pair of longitudinally extending ridge poles 351 and 352. The ridge poles 351 and 352 are supported centrally of the assembly 320 by a pair of generally U-shaped brackets 360 and 362 that are supported by a pair of transversely and downwardly extending supports 364 and 366, respectively. The supports 364 and 366 have downwardly opening generally U-shaped brackets, 368 and 370, respectively, secured thereto as by welding, for engagement with the upper edge portions 70 and 74 of the side walls 52 and 54, respectively.

Figure 19:
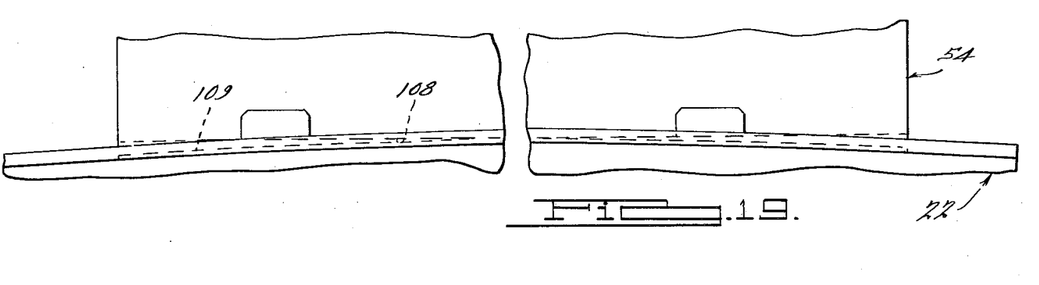
FIG. 19 is a diagrammatic side elevation of the trailer showing the initial curvature of the trailer frame, exaggerated for clarity.

Referring to FIG. 19, the trailer frame 22 is shown having a raised center portion (exaggerated for clarity) whereby, upon loading of the trailer 20, the frame 22 flexes to the straight or horizontal position. The convertible flat bed and hopper 50 of the present invention is compatible with such flexure because the side panels 52 and 54 are supported with respect to the frame 22 at only two longitudinally spaced points, thus minimizing stress of the side walls upon deflection of the trailer frame due to a load placed thereon.

As seen in FIG. 19, the side panel 54 is initially positioned with respect to the frame 22 so that the resilient member 108 on the lower edge face of the panel 54 is compressively seated on the complementary flange 109 on the longitudinal channel 96 of the frame 22 at only the midpoint of the side wall 54. As the trailer frame 22 deflects downwardly, under an increasing load, the initial point compression of the resilient gasket 108 is relieved and distributed longitudinally thereof until, when the frame 22 is substantially straight, the resilient member 108 is evenly compressed over the full length of the panel 54. In this manner, flexure of the trailer frame is accommodated while providing for a continuous and positive seal between the frame 22 and the side panel 54. The thickness of the gasket 108 can be so determined in relation to the curvature of the frame 22 so that engagement therebetween is continuous after the side panel 54 is biased downwardly to an initial position.

Another feature of the present invention is that the channels 94 and 96 function as rain gutters for the conduction of rain water longitudinally of the trailer through the open end portions thereof, thus preventing the passage of rain water into the trailer.

It is also to be noted that the front and rear panels 56 and 58 are in effect, removably hinged with respect to the supporting members 180 therefor which provides for free movement of the panels 56 and 58 longitudinally of the trailer in the folded position so as to be positionable thereof at the optimum point longitudinally of the trailer to structurally support a load. However, the panels 56 and 58 are foldable from the upright to the horizontal position about a hinge point thereby minimizing lifting and making the use of relatively heavy panels practicable in those applications requiring it.

It is also to be noted that because the side panels 52 and 54 are elevatable, the aforementioned folding of the front and rear panels 56 and 58 is accommodated without impairing the sealing function thereof and without interference between the angularly upwardly extending angle irons 200 and 202 on the side panels 52 and 54 with the downwardly depending flanges 190 on the front and rear panels 56 and 58.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A convertible flat bed and hopper for a wheeled vehicle having a pair of laterally spaced longitudinal members defining longitudinally extending substantially continuous sealing faces, respectively, and a pair of longitudinally spaced lateral members defining laterally extending substantially continuous sealing faces respectively, said convertible bed and hopper comprising a pair of longitudinal panels and a pair of lateral panels foldable between the upright and horizontal position, respectively, said panels having lower edge faces engageable with the sealing faces on respective ones of the vehicle members for seating and sealing said panels with respect to the members when in the upright position, said panels having downwardly depending flanges, respectively, extending beyond said lower edge faces for restraining outward flexure of the panels under a load of comminuted material.

2. A convertible flat bed and hopper in accordance with claim 1 wherein said longitudinal panels are held down with respect to the frame members at only two longitudinally spaced points when in the upright position to minimize deflection thereof upon deflection of the trailer under load.

3. A convertible flat bed and hopper in accordance with claim 1 wherein said lateral panels are engageable with said lateral frame members to facilitate folding thereof and are disengageable from said lateral members to facilitate movement longitudinally of the vehicle when in the downwardly folded condition.

4. A convertible flat bed and hopper in accordance with claim 1 wherein said lateral panels are angularly positioned and supported by said longitudinal panels when said lateral panels are in the upright position whereby the weight of a load within the hopper biases said lateral panels toward the supporting structure on said longitudinal panels to effect a seal therebetween.

5. A convertible flat bed and hopper for a wheeled vehicle having a pair of spaced substantially continuous longitudinal members and a pair of spaced lateral members, said convertible bed and hopper comprising a pair of longitudinal panels and a pair of lateral panels foldable between the upright and horizontal position, respectively, each of said panels having a lower edge face engageable with an upper edge face on respective ones of the frame members for seating and sealing said panels with respect to the frame members when in the upright position and a downwardly depending flange extending beyond said lower edge face engageable with an inwardly facing surface on said members for restraining outward flexure of the panels under a load of comminuted material, and pivot means on said longitudinal panels supporting said panels for rotation between the upright and horizontal positions.

6. A convertible flat bed and hopper for a wheeled vehicle having a pair of spaced longitudinally extending upwardly opening channels and a pair of spaced laterally extending members, said convertible bed and hopper comprising a pair of longitudinal panels and a pair of lateral panels foldable between the upright and horizontal position, respectively, each of said panels having a lower edge face engageable in the upright position with respective ones of the channels and lateral members for seating and sealing said panels with respect thereto, said panels having a pair of spaced flanges depending downwardly from the lower edge faces thereon in interlocking relation with the longitudinal channels and lateral members in the vehicle.

7. A convertible flat bed and hopper in accordance with claim 6 wherein one of the flanges on each of the longitudinal panels is acceptable within the bight of an associated channel and the other of the flanges is engageable with an outer surface of the channel.

8. A convertible flat bed and hopper in accordance with claim 7 wherein said longitudinal panels are supported for rotation about longitudinal axes, respectively.

9. A convertible hopper in accordance with claim 8 wherein the pivotal supports for said longitudinal panels are elevatable to retract the flanges thereof from the bight portions of the channels.

10. A convertible hopper in accordance with claim 9 wherein the pivotal supports for said longitudinal panels are lowerable to lock the inner faces thereof against said channels, respectively, in the horizontal position.

11. A convertible flat bed and hopper for a wheeled vehicle having a pair of spaced longtiudinally extending frame channels and a pair of longitudinally spaced transverse members, said convertible bed and hopper comprising a pair of spaced longitudinally extending panels, means pivotally supporting said panels for rotation between the upright and horizontal positions, said panels being engageable with said frame channels to form a labyrinth seal, a pair of spaced transversely extended panels movable between the upright and horizontal positions and engageable with the transverse members of said vehicle to form a labyrinth seal, and means for elevating the pivotal supports of said side panels to facilitate rotation thereof comprising, respectively, a nut and a lead screw movable axially with respect to said nut upon relative rotation therebetween to effect vertical movement of said panel support.

12. A convertible flat bed and hopper for a wheeled vehicle comprising a pair of spaced longitudinally extending side panels pivotally supported at the lower ends thereof for rotation about longitudinal axes, respectively, between the upright and horizontal positions, said side panels overlapping in nesting relationship in the horizontal position, a pair of longitudinally spaced transversely extending end panels movable between the upright and horizontal positions, and a transversely extending spreader bar engageable with a latch on each of said side panels to rigidify said side panels in the upright position, said latch being articulated to facilitate said nesting relationship.

13. A convertible flat bed and hopper for a wheeled vehicle having a pair of spaced longitudinally extending frame channels and a pair of longitudinally spaced transverse members, said convertible bed and hopper comprising a pair of spaced longitudinally extending panels pivotally supported at the lower ends thereof for rotation between the upright and horizontal positions and engageable with said frame channels to form a labyrinth seal, a pair of spaced transversely extended panels movable between the upright and horizontal positions and engageable with the transverse members of said vehicle to form a labyrinth seal, and a plurality of crank mechanisms for elevating the pivotal supports of said side panels to facilitate rotation thereof, each of said crank mechanisms comprising a tubular member supported by the vehicle frame, a rotatable nut supported by said tubular member and, a lead screw supporting an associated panel pivot threadably engaged with said nut and movable axially thereof to elevate said panel pivot.

14. In a convertible flat bed and hopper for a wheeled vehicle having a frame that is deflectable under load, a pair of spaced longitudinally extending side panels pivotally supported for rotation between the upright and horizontal positions, and means for initially positioning the center portions of said side panels at a first relatively small vertical spacing with respect to opposed center portions of the frame whereby the vertical spacing between said panels and the frame becomes substantially equal the full length thereof as the frame deflects under load.

15. In a convertible flat bed and hopper for a wheeled vehicle having a pair of spaced longitudinally extending frame channels having upwardly bowed center portions, respectively, that are deflectable downwardly under load, a pair of spaced longitudinally extending panels pivotally supported at only the opposite ends thereof for rotation between the upright and horizontal positions, said panels having center portions initially positionable in closely spaced relation with opposed center portions of said frame channels, respectively, the spacing between said panels and channels substantially equalizing over the length of said panels as said channels deflect toward the straight condition under load.

16. In a convertible flat bed and hopper for a wheeled vehicle having a pair of spaced longitudinally extending upwardly bowed frame channels, a pair of spaced longitudinally extending panels pivotally supported at only the opposite ends thereof for rotation between the upright and horizontal positions, a compressible seal on the lower edge face of said panels, respectively, and means for biasing the pivotal supports of said side panels downwardly with respect to the frame, thereby to initially compress said seal which compression is relieved upon downward deflection of frame channels under load.

17. A convertible flat bed and hopper for a wheeled vehicle comprising a pair of spaced longitudinally extending open-ended and upwardly opening U-shaped frame channels, a pair of spaced longitudinally extending panels pivotally supported for rotation between the upright and horizontal positions and engageable with an inner one of the legs on said U-shaped channels, respectively, in sealing relationship whereby said channels function as rain gutters to preclude direct contact between water and the seal between said panels and channels, respectively.

References Cited in the file of this patent

UNITED STATES PATENTS

| | | |
|---|---|---|
| 276,017 | Foster | Apr. 17, 1883 |
| 2,071,620 | Fitch | Feb. 23, 1937 |
| 2,768,021 | Kaster | Oct. 23, 1956 |

FOREIGN PATENTS

| | | |
|---|---|---|
| 716,699 | Germany | Jan. 27, 1942 |